(12) United States Patent
Gong (10) Patent No.: US 11,388,623 B2
(45) Date of Patent: Jul. 12, 2022

(54) METHOD, DEVICE AND APPARATUS FOR CONTROLLING CONGESTION WINDOW IN INTERNET OF VEHICLES

(71) Applicant: BOE Technology Group Co., Ltd., Beijing (CN)

(72) Inventor: Weibing Gong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 290 days.

(21) Appl. No.: 16/642,510

(22) PCT Filed: Mar. 28, 2019

(86) PCT No.: PCT/CN2019/080123
§ 371 (c)(1),
(2) Date: Feb. 27, 2020

(87) PCT Pub. No.: WO2019/192386
PCT Pub. Date: Oct. 10, 2019

(65) Prior Publication Data
US 2020/0196187 A1 Jun. 18, 2020

(30) Foreign Application Priority Data
Apr. 2, 2018 (CN) .......................... 201810284440.2

(51) Int. Cl.
*H04W 28/02* (2009.01)
*H04W 4/44* (2018.01)
*H04L 47/27* (2022.01)

(52) U.S. Cl.
CPC ......... *H04W 28/0289* (2013.01); *H04L 47/27* (2013.01); *H04W 4/44* (2018.02); *H04W 28/0215* (2013.01)

(58) Field of Classification Search
CPC ............. H04W 28/0289; H04W 72/12; H04W 28/0215; H04W 28/021; H04W 4/44; H04W 4/46; H04L 47/27
See application file for complete search history.

(56) References Cited

U.S. PATENT DOCUMENTS

| 2016/0150451 A1* | 5/2016 | Barreto De Miranda Sargento .... H04W 36/30 370/332 |
| 2020/0092685 A1* | 3/2020 | Fehrenbach ............ H04W 4/46 |

(Continued)

FOREIGN PATENT DOCUMENTS

| CN | 102244898 A | 11/2011 |
| CN | 103036803 A | 4/2013 |

(Continued)

OTHER PUBLICATIONS

Gong, et al., "An Adaptive Traffic Distribution Scheme for CMT based on Lotka-Volterra Model in Multihomed Networks", School of Computer & Communication Engineering, University of Science and Technology Beijing, China, © 1994-2020 China Academic Journal Electronic Publishing House, China Communications— Feb. 2017, pp. 79-89, www.cnki.net <http://www.cnki.net>.

(Continued)

*Primary Examiner* — Mandish K Randhawa
(74) *Attorney, Agent, or Firm* — Banner & Witcoff, Ltd.

(57) ABSTRACT

Provided are a congestion window control method, an apparatus and a device for internet of vehicles. The congestion window control method for internet of vehicle includes: determining a bandwidth requirement for each of the plurality of on-board unit sets; and determining a congestion window for each of the on-board unit sets according to the bandwidth requirements of respective sets of the plurality of on-board unit sets, wherein the plurality of on-board unit sets correspond to a plurality of on-board unit types respectively.

19 Claims, 7 Drawing Sheets

(56) References Cited

U.S. PATENT DOCUMENTS

2020/0120458 A1* 4/2020 Aldana ............. H04W 36/0088
2020/0413235 A1* 12/2020 Pateromichelakis ........................
                                                         H04W 28/0268

FOREIGN PATENT DOCUMENTS

CN      106506386 A     3/2017
WO      2018005531 A1   1/2018

OTHER PUBLICATIONS

Dec. 25, 2019—(CN) First Office Action Appn 201810284440.2 with English Translation.

* cited by examiner

METHOD, DEVICE AND APPARATUS FOR CONTROLLING CONGESTION WINDOW IN INTERNET OF VEHICLES

CROSS-REFERENCE TO RELATED APPLICATION

The application is a U.S. National Phase Entry of International Application No. PCT/CN2019/080123 filed on Mar. 28, 2019, designating the United States of America and claiming priority to Chinese Patent Application No. 201810284440.2 filed on Apr. 2, 2018. The present application claims priority to and the benefit of the above-identified applications and the above-identified applications are incorporated by reference herein in their entirety.

TECHNICAL FIELD

The present disclosure relates to a field of Internet of Vehicles, and in particular to a congestion window control method, apparatus and device for internet of vehicles.

BACKGROUND

The Internet of Vehicles is an on-board self-organizing network that is used to implement communication between the vehicles and between a vehicle and roadside units during movement. On the one hand, in the Internet of Vehicles, since a speed of the vehicle is fast, the communication between the vehicle and the roadside units may be implemented by switching frequently the communication among the roadside units. In addition, due to the sparse deployment of the roadside units, signals received by the roadside units are weak or no signal is received by the roadside units, and a link rate between the vehicle and the roadside units is low, resulting in a congestion in the wireless transmission of vehicle in this area. At the same time, in an area where relatively dense vehicles are on the road, respective vehicles need safety message exchanges more frequently. However, due to the limited deployment of roadside units, congestions are prone to occur in wireless transmission in this area.

On the other hand, different vehicles have different capabilities for receiving signals. If the capability for receiving signals of the vehicle is poor, the wireless transmission rate between the vehicle and the roadside units is reduced. In order to meet the business requirements of vehicles with poor signal receiving capabilities, it is necessary to allocate more bandwidth resources to the vehicles with poor signal reception capabilities, which results in correspondingly reduced bandwidth allocated to other vehicles at the same time, leading to a congestion of bandwidth services in this area, thereby user experience is affected.

Therefore, for vehicles with different capabilities in the Internet of Vehicles, a congestion window control method is needed to solve the above problems.

SUMMARY

A congestion window control method for Internet of Vehicles comprising a plurality of on-board unit sets is provided according to an aspect of the present disclosure. The method comprises: determining a bandwidth requirement for each of the plurality of on-board unit sets; and determining a congestion window for each of the on-board unit sets according to the bandwidth requirements of respective sets of the plurality of on-board unit sets, wherein the plurality of on-board unit sets correspond to a plurality of on-board unit types respectively.

According to an aspect of the present disclosure, for each of the plurality of on-board unit sets, the bandwidth requirement for the set is determined according to the number of the on-board units in the set and a reference bandwidth requirement of each on-board unit in the set, wherein the reference bandwidth requirement of the on-board unit is determined according to the type of the on-board unit.

According to an aspect of the present disclosure, a maximum bandwidth capacity assigned to each of the plurality of on-board unit sets by a current roadside unit is determined according to the bandwidth requirements of respective sets of the plurality of on-board unit sets; and a maximum congestion window for each of the plurality of on-board unit sets is determined according to the maximum bandwidth capacity assigned to each of the plurality of on-board unit sets by the current roadside unit.

According to an aspect of the present disclosure, determining the congestion window for each of the on-board unit sets according to the bandwidth requirements of respective sets of the plurality of on-board unit sets further comprises: for each of the plurality of on-board unit sets, determining the congestion window of the set by iterative calculation according to competition parameters between the set and other sets and a maximum congestion window of the set.

According to an aspect of the present disclosure, determining the congestion window for each of the on-board unit sets according to the bandwidth requirements of respective sets of the plurality of on-board unit sets further comprises: for each of the plurality of on-board unit sets, determining the congestion window of the set by iterative calculation according to competition parameter between the set and other sets, competition parameter between the on-board units in the set and a maximum congestion window of the set.

According to an aspect of the present disclosure, the method further comprises: calculating the competition parameter between the respective on-board units in each on-board unit set iteratively.

According to an aspect of the present disclosure, the competition parameters between each on-board unit set and other on-board unit sets is predetermined according to statistical analysis.

According to an aspect of the present disclosure, the on-board unit types include cluster-head on-board unit, non-cluster-head on-board unit and bandwidth-reserved on-board unit, wherein the cluster-head on-board unit and the non-cluster-head on-board unit are on-board units which are connected to current roadside unit, wherein the cluster-head on-board unit include on-board unit which implements its own bandwidth application and forwards traffic of the non-cluster-head on-board unit, and the non-cluster-head on-board unit only implements its own bandwidth application, and the bandwidth-reserved on-board unit is on-board unit which is connected to a neighbor roadside unit and is transmitting traffic.

According to an aspect of the present disclosure, if no new on-board unit is accessed within a predetermined time period, the congestion window of each set reaches stability.

According to an aspect of the present disclosure, a congestion window control apparatus for Internet of Vehicles comprising a plurality of on-board unit sets is provided. The apparatus comprises: a bandwidth requirement determination unit configured to determine a bandwidth requirement for each of the plurality of on-board unit sets; and a congestion window determination unit configured to determine a congestion window for each of the on-board unit sets according to the bandwidth requirements of respective sets of the plurality of on-board unit sets, wherein the plurality of on-board unit sets correspond to a plurality of on-board unit types respectively.

According to an aspect of the present disclosure, for each of the plurality of on-board unit sets, the bandwidth requirement determination unit determines the bandwidth requirement for the set according to the number of the on-board units in the set and a reference bandwidth requirement of each on-board unit in the set, wherein the reference bandwidth requirement of the on-board unit is determined according to the type of the on-board unit.

According to an aspect of the present disclosure, the congestion window determination unit determines a maximum bandwidth capacity assigned to each of the plurality of on-board unit sets by a current roadside unit according to the bandwidth requirements of respective sets of the plurality of on-board unit sets; and the congestion window determination unit determines a maximum congestion window for each of the plurality of on-board unit sets according to the maximum bandwidth capacity assigned to each of the plurality of on-board unit sets by the current roadside unit.

According to an aspect of the present disclosure, for each of the plurality of on-board unit sets, the congestion window determination unit determines the congestion window of the set by iterative calculation according to competition parameter between the set and other sets and a maximum congestion window of the set.

BRIEF DESCRIPTION OF THE DRAWINGS

The above and other objects, features, and advantages of the present disclosure will become more obvious by describing the embodiments of the present disclosure in more detail with reference to the accompanying drawings. The drawings are used to provide a further understanding of the embodiments of the present disclosure, and constitute a part of the specification. The drawings are used to explain the present disclosure together with the embodiments of the present disclosure, and do not constitute a limitation on the present disclosure. In the drawings, the same reference numerals generally represent the same components or steps.

DETAILED DESCRIPTION

In order to make purposes, features and advantages of the present disclosure more obvious, exemplary embodiments according to the present disclosure will be described in detail below with reference to the accompanying drawings.

Figure 1:
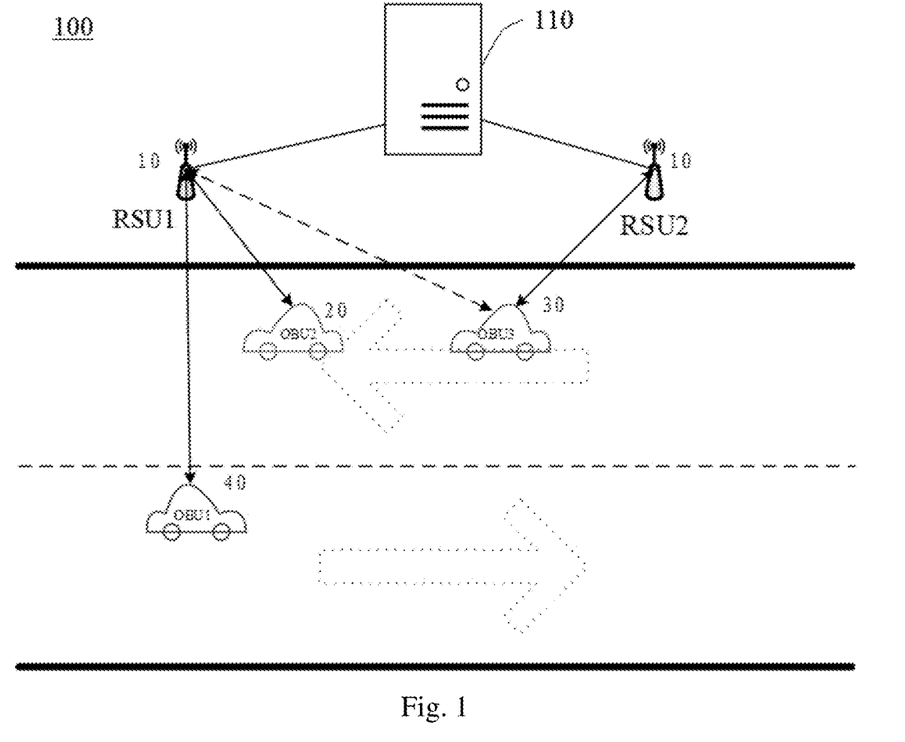
FIG. 1 illustrates a schematic diagram of an Internet of Vehicles system for implementing embodiments of the present disclosure.

FIG. 1 illustrates a schematic diagram of an Internet of Vehicles system 100 for implementing embodiments of the present disclosure. Firstly, with reference to FIG. 1, an Internet of Vehicles system in which embodiments according to the present disclosure can be applied is described. The Internet of Vehicles system includes a plurality of roadside units (RSU1, RSU2) and a plurality of on-board units (OBU1, OBU2, OBU3). The plurality of on-board units may include on-board units 20 (OBU2), 30 (OBU3), 40 (OBU1), etc., wherein the on-board unit 20 (OBU2) may communicate with the roadside unit RSU1. In other words, the roadside unit RSU1 is the current serving roadside unit of the onboard unit 20. The Internet of Vehicles system 100 in FIG. 1 further includes a control center 110. For example, the control center 110 may be used to handle a congestion window control method for the Internet of Vehicles according to the present disclosure.

As mentioned above, due to fast speed of the vehicle, the communication between the vehicle and the roadside units may be implemented by switching frequently the communication among the roadside units. Due to sparse deployment of the roadside units, too dense vehicles, or poor signal receiving capability of the vehicle, the signals received by the roadside units may be weak or no signal is received. Alternatively, since the link rate between the vehicle and the roadside units is low, congestion occurs to the wireless transmission of vehicles in this area, which further affects the user's experience.

Therefore, among all on-board units in the Internet of Vehicles, the on-board units need to be clustered according to current communication states of the on-board units, so that on-board units with different communication states can adaptively obtain corresponding congestion windows, wherein the congestion windows correspond to bandwidths that can be assigned to the on-board units. Thereby, congestion of the wireless transmission described above can be avoided.

The Internet of Vehicles according to the present disclosure may include the plurality of on-board units, and the on-board units in the Internet of Vehicles may be divided into different on-board unit sets according to the communication states of the on-board units. That is, each on-board unit set may include one or more on-board units in a same communication state. The Internet of Vehicles may include the plurality of on-board unit sets. The plurality of on-board unit sets may refer to two or more on-board unit sets. In the embodiments of the present disclosure, a situation where there are three on-board unit sets is exemplarily described. It should be understood, however, that in other embodiments according to the present disclosure, the number of on-board unit sets is not limited to three and may be two or more.

Figure 3:
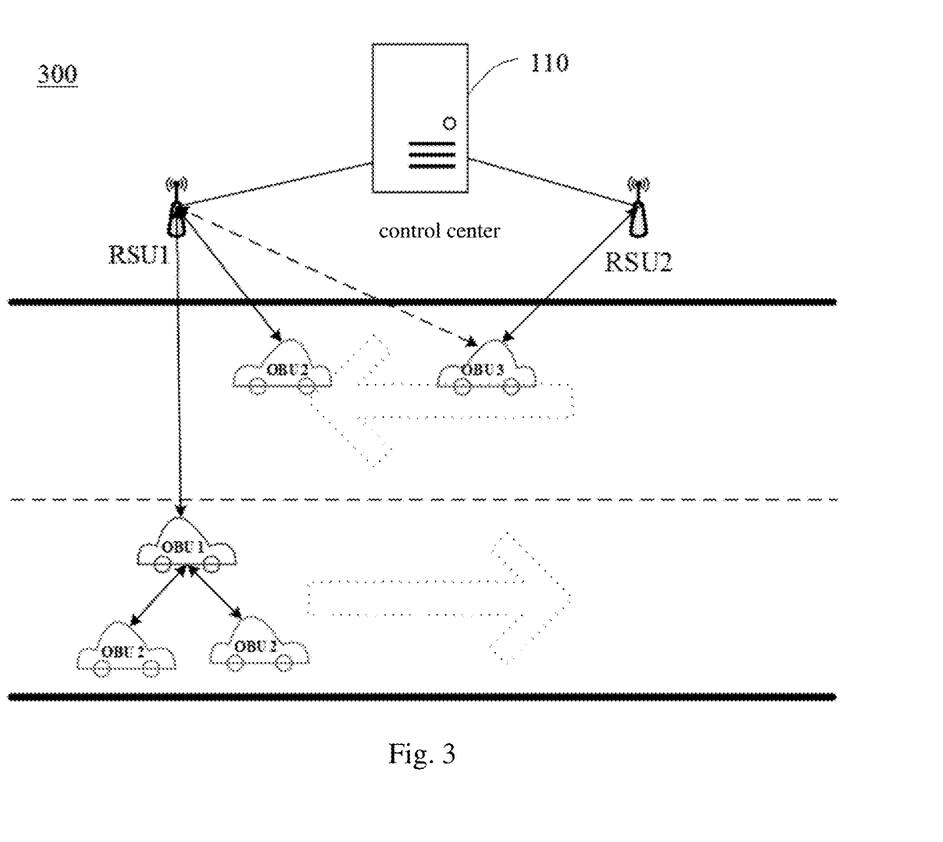
FIG. 3 illustrates an example of a plurality of onboard unit types according to embodiments of the present disclosure.

An example of the plurality of on-board unit types according to embodiments of the present disclosure is described below with reference to FIG. 3. As shown in FIG. 3, in one example, the on-board unit types can be divided according to the current communication states between the on-board units and the roadside units, and on-board units belonging to a same type are represented as one on-board unit set. For example, the on-board unit types may include a cluster-head on-board unit OBU1, a non-cluster-head on-board unit OBU2, and a bandwidth-reserved on-board unit OBU3. Based on the above types, the on-board units belonging to the same type can be represented as one on-board unit set. For example, the three non-cluster-head on-board units OBU2 included in FIG. 3 may be represented as an on-board unit set corresponding to the non-cluster-head on-board unit type, and the one cluster-head on-board unit OBU1 included in FIG. 3 may be represented as an on-board unit set corresponding to the cluster-head on-board unit type. In other words, the on-board unit sets have a one-to-one correspondence to the on-board unit types.

According to the embodiments of the present disclosure, the cluster-head on-board unit OBU1 and the non-cluster-head on-board unit OBU2 may be on-board units connected to a current roadside unit RSU1. The cluster-head on-board unit OBU1 may be an on-board unit capable of implementing its own bandwidth application and forwarding the communication traffic of the non-cluster-head on-board units OBU2. In other words, the cluster-head on-board unit OBU1 can forward the communication traffic for a non-cluster-head on-board unit OBU2 that is connected to a roadside unit with a weak signal or not connected to the roadside unit. In addition, the cluster-head on-board unit OBU1 has sufficient forwarding capability. That is, its own bandwidth utilization capability is not affected in the process of implementing traffic forwarding for the non-cluster-head on-board unit OBU2. The non-cluster-head on-board unit OBU2 may be an on-board unit that only implements its own bandwidth application. That is, the non-cluster-head on-board unit OBU2 is not used to implement traffic forwarding for other non-cluster-head on-board units OBU2. The bandwidth-reserved on-board unit OBU3 may be an on-board unit that is connected to a neighbor roadside unit and is transmitting traffic. For example, the bandwidth-reserved on-board unit OBU3 shown in FIG. 3 may be an on-board unit connected to the neighbor roadside unit (such as the roadside unit RSU2 in FIG. 3) and is transmitting traffic and is going to be connected to the current roadside unit (such as the roadside unit RSU1 in FIG. 3) soon. If the vehicle speed is fast, bandwidth may be reserved for such on-board unit that is connecting to a neighbor roadside unit and going to be connected the current roadside unit, which can realize fast bandwidth switching without waiting for reassignment of bandwidth.

As described above, in the embodiments according to the present disclosure, priority of the on-board unit can be set according to importance and contribution of the on-board unit. For example, since the cluster-head on-board unit OBU1 needs to forward traffic for other non-cluster-head on-board units OBU2, it can be considered that its importance and contribution is the highest when it applies for bandwidth. Thus, on-board units of this type may be set to have the highest priority, the non-cluster-head on-board units OBU2 have a second highest priority, and the bandwidth-reserved on-board units OBU3 have the lowest priority.

It should be noted that the present disclosure is not limited to the above-mentioned classification method for the on-board unit types, and any classification method regarding to importance and contribution is applicable to the present disclosure.

As mentioned above, a plurality of on-board unit types (determined according to the current communication states of the on-board units) may correspond to different sets of on-board units. For example, the cluster-head on-board unit OBU1 corresponds to the cluster head on-board unit set, and the non-cluster-head on-board unit OBU2 corresponds to a non-cluster-head on-board unit set, and the bandwidth-reserved on-board unit OBU3 corresponds to a bandwidth-reserved on-board unit set.

After the on-board unit sets are determined, according to the congestion window control method of the embodiments of the present disclosure, the congestion window corresponding to each on-board unit set can be determined according to the bandwidth requirements of each on-board unit set, so that on-board units with different communication states may adaptively obtain corresponding congestion windows, thereby avoiding the above-mentioned congestion phenomenon for wireless transmission.

Hereinafter, a congestion window control method 200 for the Internet of Vehicles according to embodiments of the present disclosure will be described in detail with reference to FIG. 2. This method may be handled by a control center such as a central controller (e.g., the control center shown in FIG. 1). The control center can be connected to the roadside units and the on-board units in a wired or wireless manner, and can obtain all information sent by the roadside units and the on-board units. By utilizing this method, for example, the control center can adaptively determine a congestion window assigned to each on-board unit set according to the bandwidth requirement of the respective on-board unit sets among the on-board unit sets.

Figure 2:
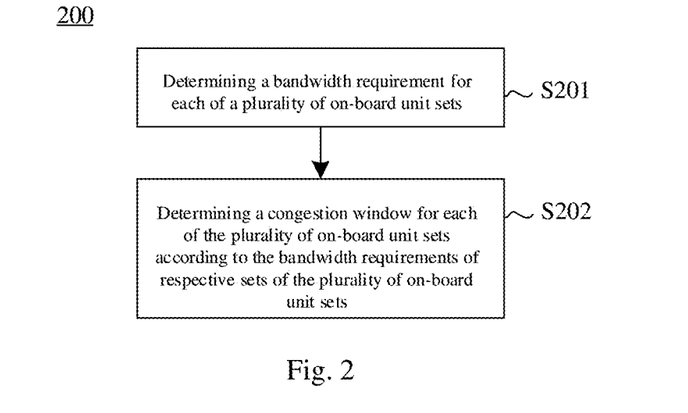
FIG. 2 illustrates a flowchart of a congestion windows control method of the Internet of Vehicles according to embodiments the present disclosure.

As shown in FIG. 2, in step S201, the bandwidth requirement of each of the plurality of on-board unit sets is determined.

Firstly, for each of the plurality of on-board unit sets, the bandwidth requirements of the set may be determined according to the number of on-board units included in the set and the reference bandwidth requirement of each on-board unit in the set.

According to the embodiments of the present disclosure, the reference bandwidth requirement of the on-board unit may be determined according to the type of the on-board unit. Different types of on-board units have different reference bandwidth requirements. The reference bandwidth requirement may be preset. For example, the control center may perform statistical analysis on the reference bandwidth requirements of different on-board unit types to preset the reference bandwidth requirements of the different on-board unit types. Alternatively, the reference bandwidth requirement may be determined by an operator according to certain calculation rules, which may be related to the importance or contribution of the on-board unit type. For example, because an on-board unit with high importance has the highest priority when applying for the bandwidth, it can be determined that a relatively high reference bandwidth requirement is set for this type of on-board unit, and relatively low reference bandwidth requirements are set for other on-board units with lower priority.

After the reference bandwidth requirement of each on-board unit in each set is determined, the control center may obtain a number of the on-board units belonging to respective on-board unit sets from information sent by the on-board units.

Then, the bandwidth requirement of each on-board unit set is determined according to the determined number of on-board units in the set and the reference bandwidth requirement of each on-board unit in the set.

For example, in one embodiment according to the present disclosure, three on-board unit sets $G_1$, $G_2$, $G_3$ may be included. The reference bandwidth requirements corresponding to the three on-board unit sets are $\theta_1$, $\theta_2$, and $\theta_3$. For example, the reference bandwidth requirement corresponding to the on-board unit set may be a sum of the reference bandwidth requirement of each on-board unit in the on-board unit set. The number of on-board units included in the three on-board unit sets $G_1$, $G_2$, $G_3$ may be $N_1$, $N_2$, $N_3$, respectively. Then the bandwidth requirement $BR_1$ of the on-board unit set $G_1$ may be expressed as:

$$BR_1 = \frac{\theta_1 N_1}{\theta_1 N_1 + \theta_2 N_2 + \theta_3 N_3}$$

Similarly, the bandwidth requirement $BR_2$ of the on-board unit set $G_2$ may be expressed as:

$$BR_2 = \frac{\theta_2 N_2}{\theta_1 N_1 + \theta_2 N_2 + \theta_3 N_3}$$

The bandwidth requirement $BR_3$ of the on-board unit set $G_3$ may be expressed as:

$$BR_3 = \frac{\theta_3 N_3}{\theta_1 N_1 + \theta_2 N_2 + \theta_3 N_3}$$

In the embodiments of the present disclosure, the method for determining the bandwidth requirements of different sets is not limited to the above-mentioned method, and other methods may also be used to obtain the bandwidth requirements of the on-board unit sets.

Next, in step S202, the congestion window for each of the plurality of on-board unit sets is determined according to a bandwidth requirement of each of the plurality of on-board unit sets.

First, for each of the plurality of on-board unit sets, a maximum bandwidth capacity that the current roadside unit can assigned to the set can be determined according to the bandwidth requirements of the respective on-board unit sets. For example, the maximum bandwidth capacity that the current roadside unit can assign to the set $G_1$ of the plurality of on-board unit sets can be expressed as:

$$BMAX_{OBU(1)} = BR_1 * BCAP_{RSU}$$

Herein, $BCAP_{RSU}$ denotes a basic bandwidth capacity of the current roadside unit. The basic bandwidth capacity of the current roadside unit can be obtained by the control center from information sent by the roadside unit, or can be preset by the control center.

Similarly, a maximum bandwidth capacity that the current roadside unit can assign to the on-board set $G_2$ can be expressed as:

$$BMAX_{OBU(2)} = BR_2 * BCAP_{RSU}$$

A maximum bandwidth capacity that the current roadside unit can assign to the on-board set $G_3$ can be expressed as:

$$BMAX_{OBU(3)} = BR_3 * BCAP_{RSU}$$

In the embodiments of the present disclosure, the method for determining the maximum bandwidth capacity for different sets is not limited to the above-mentioned method, other methods can be adopted to obtain the maximum bandwidth capacity.

After determining the maximum bandwidth capacity that the current roadside unit can assign to each of the plurality of on-board unit sets, a maximum congestion window for each of the plurality of on-board unit sets can be determined according to the maximum bandwidth capacity that can be assigned to each of the plurality of on-board sets. For example, the maximum congestion window of the on-board unit set $G_1$ can be expressed as:

$$R_1 = \min\{BCAP_{OBU(1)}, BMAX_{OBU(1)}\}$$

Herein, $BCAP_{OBU(1)}$ denotes the basic bandwidth capacity of the on-board unit set $G_1$.

Similarly, the maximum congestion window of the on-board unit set $G_2$ can be expressed as:

$$R_2 = \min\{BCAP_{OBU(2)}, BMAX_{OBU(2)}\}$$

The maximum congestion window of the on-board unit set $G_3$ can be expressed as:

$$R_3 = \min\{BCAP_{OBU(3)}, BMAX_{OBU(3)}\}$$

Herein, $BCAP_{OBU(2)}$ and $BCAP_{OBU(3)}$ respectively denote the basic bandwidth capacity of the on-board unit set $G_2$ and the basic bandwidth capacity of the on-board unit set $G_3$. The basic bandwidth capacity $BCAP_{OBU(1)}$, $BCAP_{OBU(2)}$, $BCAP_{OBU(3)}$ can be predetermined based on statistical analysis.

According to the embodiments of the present disclosure, after determining the maximum congestion window of each on-board unit set, for each of the plurality of on-board unit sets, an iterative calculation may be performed according to the maximum congestion window of the set and competition parameters between the set and other sets, so as to determine the congestion window for the set.

For example, the competition parameters between the set and other sets are predetermined based on statistical analysis. According to the embodiments of the present disclosure, if no new on-board unit is accessed within a predetermined time period, the congestion window of each set reaches stability. Under the premise of stable bandwidth, if the congestion window of one on-board unit set increases, in order to keep the roadside units from being congested, it is inevitable that the congestion windows of the other on-board unit sets will decrease. The congestion window of each on-board unit set will affect congestion windows of the other on-board unit sets. The values of the competition parameters of one on-board unit set depend on comparison in terms of importance and contribution among the set and other on-board unit sets. Based on this, a proportion of the competition parameters among a plurality of sets can be determined.

For simplicity, without loss of generality, for example, it is assumed that the an on-board unit set has same influence parameters (i.e., competition parameters) for other on-board unit sets, that is, $\alpha_{ij} = \alpha_{kj}$, $k \neq i$, where $\alpha_{ij}$ denotes an influence parameter of an on-board unit set j relative to an on-board unit set i, $\alpha_{kj}$ denotes an influence parameter of the on-board unit set j relative to an on-board unit set k. In other words, a same on-board unit set j has a same influence parameter for other on-board unit sets, for example, on-board unit sets i and k. However, different on-board unit sets may have different influence parameters for the same on-board unit set, i.e., $\alpha_{ij} \neq \alpha_{ik}$, $k \neq j$. $\alpha_{ik}$ denotes the influence parameter of the on-board unit set k relative to the on-board unit set i. In other words, different on-board unit set j and on-board unit set k have different influence parameters for the on-board unit set i.

For example, in the above clustering, the influence parameters of the on-board unit set relative to other on-board unit sets may be determined according to the on-board unit types in the on-board unit set. For example, it can be considered that the cluster-head on-board unit set including the cluster-head on-board unit OBU1 has the greatest importance and contribution, and therefore has the largest influence parameter relative to other on-board unit sets. The influence parameter of the non-cluster head on-board unit set including the non-cluster head on-board unit OBU2 is the second, and the bandwidth-reserved on-board unit set including the bandwidth-reserved on-board unit OBU3 has the lowest influence parameter.

For each set of the plurality of on-board unit sets, an iterative calculation may be performed according to the competition parameters (i.e., the above-mentioned influence parameters) between the set and other sets, the competition parameters between the on-board units in the set, and the maximum congestion window of the set, so as to determine the congestion window of the set. The steps of a method for determining the congestion window for each on-board unit set according to embodiments of the present disclosure are described below with reference to FIG. 4.

Figure 4:
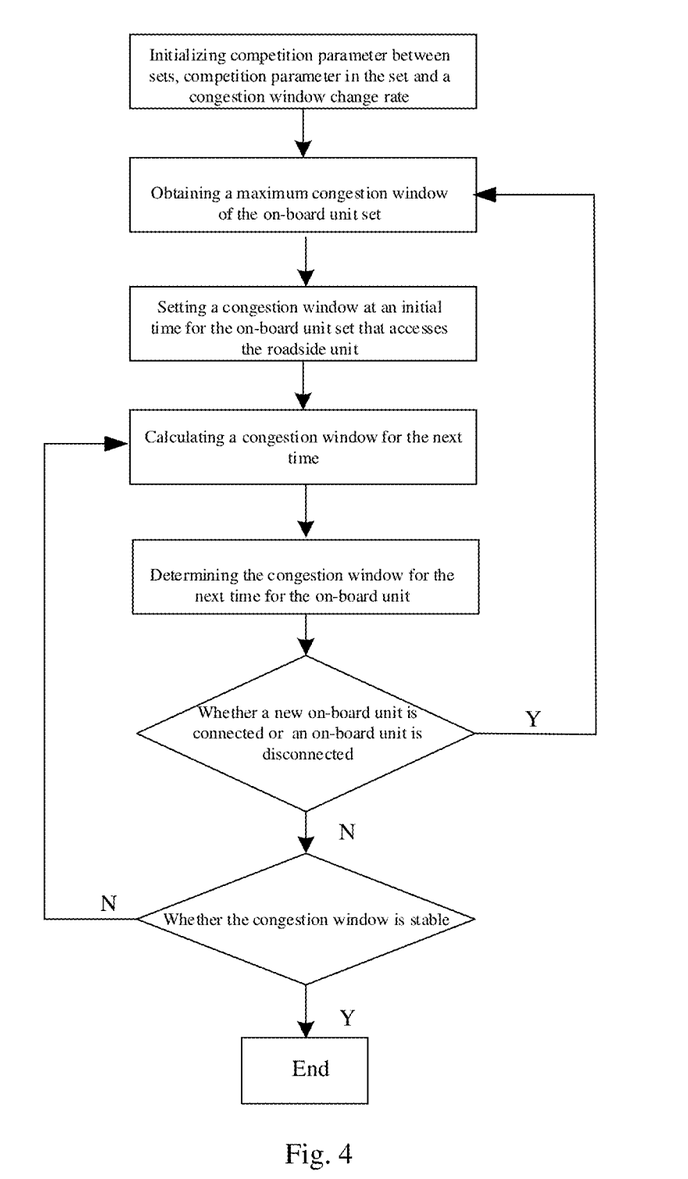
FIG. 4 illustrates steps of a method for determining a congestion window for each on-board unit set according to embodiments of the present disclosure.

Particularly, it is assumed that the Internet of Vehicles includes N on-board unit sets $\{G_1, G_2 \ldots G_N\}$. Next, steps for determining the congestion window of the set is described in detail by taking on-board unit set $G_i$ as an example.

First, a competition parameter $\alpha_{in}$ between the on-board unit set $G_i$ and other sets, a competition parameter $\beta_i$ between the on-board units in the on-board unit set $G_i$, and a congestion window change rate $\gamma_i$ of the on-board unit set $G_i$ is initialized, where $\alpha_{in}$, $\beta_i$ and $\gamma_i$ can be obtained through statistical analysis. Among them, $\alpha_{in}$ denotes a competition parameter of the other N−1 on-board unit sets $G_n$ relative to the on-board unit set $G_i$. The congestion window change rate $\gamma_i$ reflects a rate of change of the congestion window of the set $G_i$.

Then, a maximum congestion window $R_i$ of the on-board unit set $G_i$ can be obtained according to the method described above. For the above-mentioned bandwidth-reserved on-board unit OBU3, a list in a neighbor roadside unit may also be directly accessed to obtain related information of the bandwidth-reserved on-board unit OBU3.

Next, the congestion window at an initial time (t=0) is set for the on-board unit set $G_i$ that accesses the roadside unit, $x_i(t)|_{t=0} = x_i(0)$, and an initial value $w_i(t)|_{t=0} = w_i(0)$ of the competition adjustment window is calculated for the time t=0. Among them, $x_i(t)$ denotes a size of the congestion window of the on-board unit set accessing the roadside unit at time t, which needs to satisfy $$\frac{w_i(0)}{x_i(0)} > \beta_i.$$

Furthermore, it can be calculated to obtain $w_i(t+1) = R_i - \Sigma_{n=1, n \neq i}^{N} \alpha_{in} x_n(t)$. Then, a congestion window for the next time t+1 is calculated according to the following equation:

$$x_i(t+1) = \frac{w_i(t+1)}{\left(\frac{w_i(0)}{x_i(0)} - \beta_i\right)^{\frac{w_i(t+1)}{w_i(0)}} e^{-\frac{\gamma_i w_i(t+1)}{R_i}(t+1)} + \beta_i}$$

Next, the control center sets for the on-board unit set $G_i$ a congestion window $x_i(t+1)$ for the next time t+1.

Then, after time (t+1), the control center determines whether a new on-board unit is connected to the roadside unit or whether an on-board unit connected to the roadside unit is disconnected, and if so, it recalculates the maximum congestion window. If there is no new on-board unit connected to the roadside unit or no on-board unit connected to the roadside unit is disconnected, it is determined whether the congestion window has reached a stable state, and if it is determined that the congestion window has reached a stable state, the process ends. If it is determined that the congestion window has not reached a stable state, the congestion window is iteratively calculated until the congestion window reaches a stable state. For example, it can be determined whether the congestion window is stable by determining whether the change rate of the congestion window is within a predetermined threshold range during certain period of time, where the threshold range can be determined according to statistical analysis. It should be noted that the method for determining whether the congestion window is stable is not limited to the above mentioned method, and other methods may also be used to determine whether the congestion window is stable.

In addition, in the process of iterative calculation to determine the congestion window of the set, it is also possible to iteratively calculate the competition parameters between the on-board units in the set.

Figure 5:
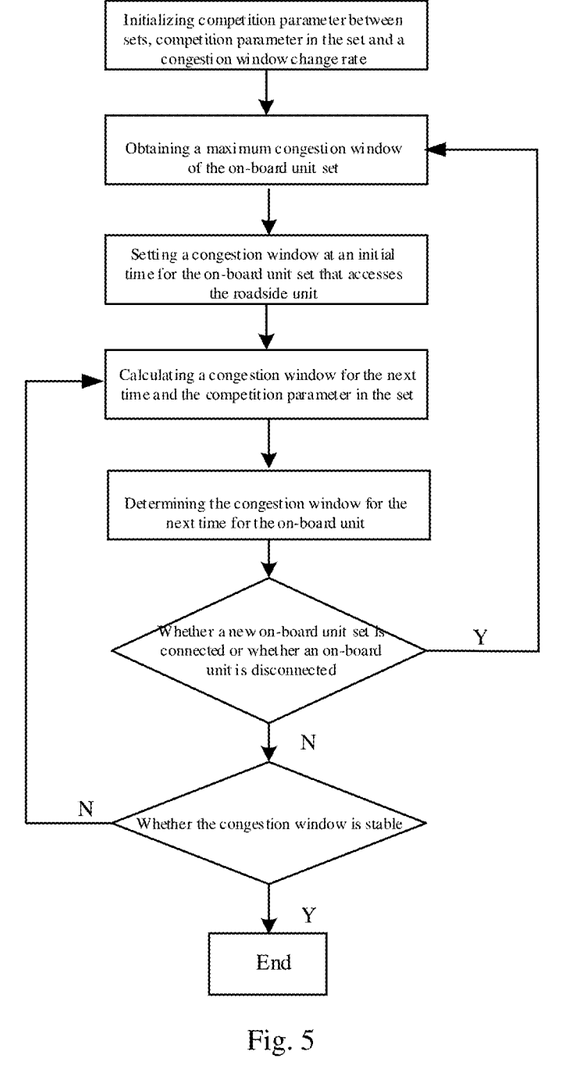
FIG. 5 illustrates steps of another method for determining a congestion window for each on-board unit set according to embodiments of the present disclosure.

Steps of another method for determining the congestion window for each on-board unit set according to embodiments of the present disclosure are described below with reference to FIG. 5.

Particularly, it is also assumed that the Internet of Vehicles includes N on-board unit sets $\{G_1, G_2 \ldots G_N\}$. Next, steps for determining the congestion window of the set is described in detail by taking on-board unit set $G_i$ as an example.

First, the competition parameter $\alpha_{in}$ between the this set and other sets, the competition parameter $\beta_i(0)$ between the on-board units in this on-board unit set, and the congestion window change rate $\gamma_i$ of this on-board unit set $G_i$ is initialized, where $\alpha_{in}$, $\beta_i$ and $\gamma_i$ can be obtained through statistical analysis.

Then, the maximum congestion window $R_i$ of the on-board unit set $G_i$ can be obtained according to the method described above. For the above-mentioned bandwidth-reserved on-board unit OBU3, the list in the neighbor roadside unit may also be directly accessed to obtain related information of the bandwidth-reserved on-board unit OBU3.

Next, the congestion window at the initial time (t=0) is set for the on-board unit set $G_i$ that accesses the roadside unit, $x_i(t)|_{t=0} = x_i(0)$, and the initial value $w_i(t)|_{t=0} = w_i(0)$ of the competition adjustment window is calculated for the time t=0, which needs to satisfy $$\frac{w_i(0)}{x_i(0)} > \beta_i(0).$$

Furthermore, it can be calculated to obtain $w_i(t+1) = R_i - \Sigma_{n=1, n \neq i}^{N} \alpha_{in} x_{in}(t)$. The competition parameter in the set is updated using equation $$\beta_i(t+1) = \frac{\sum_{1=n}^{N} w_i(t)}{BCAP_{RSU}}.$$

Then, the congestion window for the next time t+1 is calculated according to the following equation:

$$x_i(t+1) = \frac{w_i(t+1)}{\left(\frac{w_i(0)}{x_i(0)} - \beta_i(t+1)\right)^{-\frac{w_i(t+1)}{w_i(0)}} e^{-\frac{\gamma_i w_i(t+1)}{R_i}(t+1)} + \beta_i(t+1)}.$$

Next, the control center sets for the on-board unit set $G_i$ the congestion window $x_i(t+1)$ for the next time t+1.

Then, after time (t+1), the control center determines whether a new on-board unit is connected to the roadside unit or whether an on-board unit connected to the roadside unit is disconnected, and if so, it recalculates the maximum congestion window. If there is no new on-board unit connected to the roadside unit or no on-board unit connected to the roadside unit is disconnected, it is determined whether the congestion window has reached a stable state, and if it is determined that the congestion window has reached a stable state, the process ends. If it is determined that the congestion window has not reached a stable state, the congestion window and the competition parameter in the set are iteratively calculated until the congestion window reaches a stable state. For example, it can be determined whether the congestion window is stable by determining whether the change rate of the congestion window is within the predetermined threshold range during certain period of time, where the threshold range can be determined according to statistical analysis. It should be noted that the method for determining whether the congestion window is stable is not limited to the above mentioned method, and other methods may also be used to determine whether the congestion window is stable.

As described above, an algorithm that only iteratively calculates the congestion window until the congestion window reaches a stable state can increase an iteration rate, so that the congestion window can reach a stable state more quickly. Compared with the algorithm that iteratively calculates only the congestion window, the algorithm which iteratively calculates the congestion window and the competition parameter in the set can more adaptively determine the congestion window assigned for different sets.

In the above embodiment of the present disclosure, if no new on-board unit is added and no on-board unit that has been connected to the roadside unit is disconnected, the congestion window of each on-board unit will reach a stable state after a period of time. However, in actual environment for the Internet of Vehicles, the on-board units are randomly connected to or disconnected from the roadside unit. The above algorithm is adopted to calculate the congestion window for each newly connected on-board unit according to actual situation (such as the number of the on-board units connected to the roadside unit, the competition parameter between different sets and the competition parameter in a set) until the congestion window reaches a stable state.

Through the above congestion window control algorithm, each on-board unit has one maximum congestion window, which can control a total bandwidth of the on-board units connected to the roadside unit to not be too large and cause serious congestion, and this window can gradually increase based on the actual communication scenarios of the Internet of Vehicles, such as the number of on-board units connected and the types of the on-board units, thereby bandwidth may be adaptively assigned to different on-board units.

Figure 6:
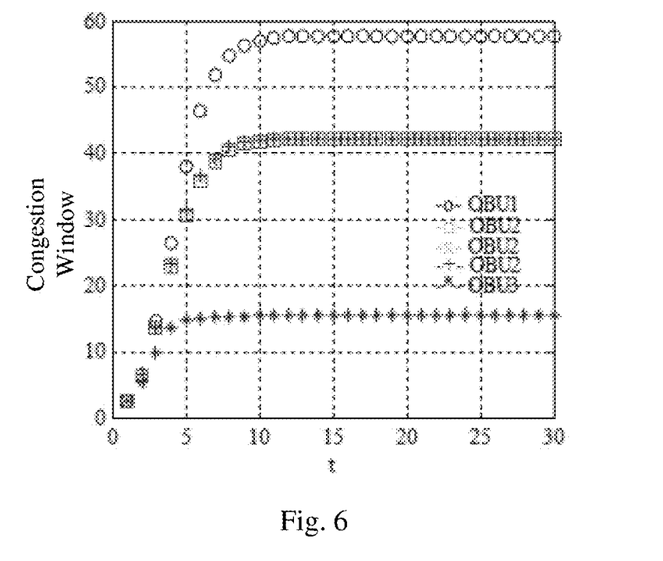
FIG. 6 is a diagram illustrating a congestion window change trend of a congestion window control algorithm according to embodiments of the present disclosure.

Hereinafter, a congestion window change trend diagram of the congestion window control algorithm according to embodiments of the present disclosure is described with reference to FIG. 6. FIG. 6 illustrates the congestion window change trend diagram of the congestion window control algorithm (LUV) according to embodiments of the present disclosure. In the following, the on-board units are divided into three types of OBU1, OBU2, and OBU3 as described above.

As shown in FIG. 6, at time t=0, the congestion window of each type of on-board unit is increasing rapidly. With increase of time, around time t=5, the congestion window of OBU3 first reaches its stable state, and the congestion windows of OBU1 and OBU2 continue to increase. Until time t=12, the congestion windows of OBU1 and OBU2 respectively reach their stable states. In the end, the three types of on-board units OBU1, OBU2, and OBU3 all reach stable states ultimately over time.

Figure 7:
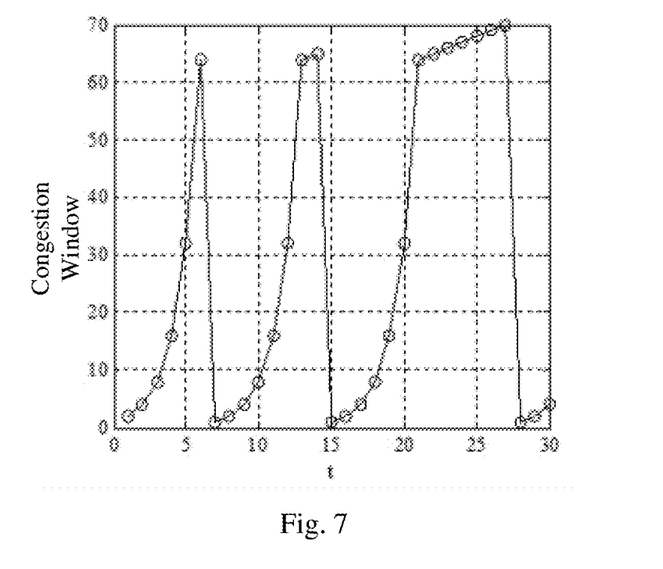
FIG. 7 is a diagram illustrating a congestion window change trend of a slow start control algorithm.

In the prior art, Slow Start algorithm is commonly used as TCP congestion control mechanism. Basic principle of the slow start algorithm is as follows: when TCP starts to transmit data in the network, actual network capacity is tested continuously until a preset congestion window threshold is reached, so as to avoid congestion caused if too much data is sent. Hereinafter, a congestion window change trend diagram of the slow start control algorithm is described with reference to FIG. 7. FIG. 7 is a diagram illustrating the congestion window change trend of the slow start control algorithm.

As shown in FIG. 7, around time t=0, the congestion window of the on-board unit grows rapidly. Around time t=6, t=14, and t=27, congestion occurs, and then the congestion window threshold is halved, an exponential increase phase and a linear growth phase are restarted, which is then followed by another cycle.

After describing the congestion window control algorithm according to the embodiments of the present disclosure and the TCP congestion control slow start algorithm, we compare the two algorithms to highlight the advantageous effects of the congestion window control algorithm according to the embodiments of the present disclosure.

Figure 8:
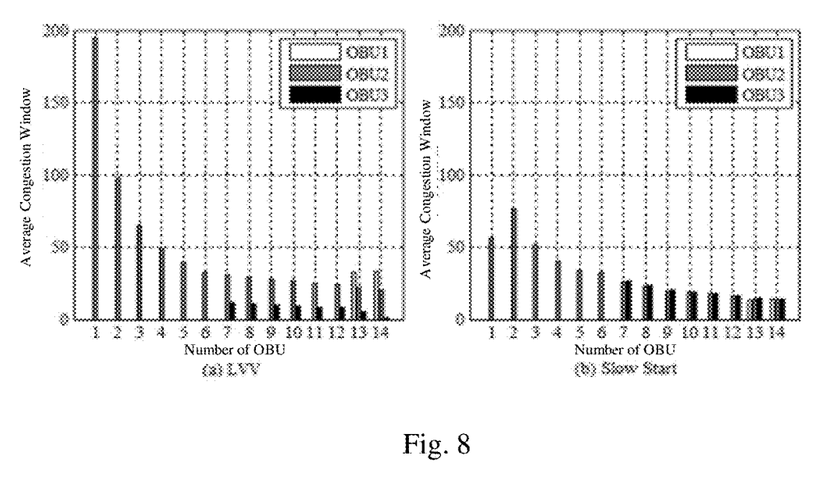
FIG. 8 is a comparison diagram illustrating changes of the respective average congestion windows of the congestion window control algorithm according to embodiments of the present disclosure and the slow start control algorithm.
Figure 9:
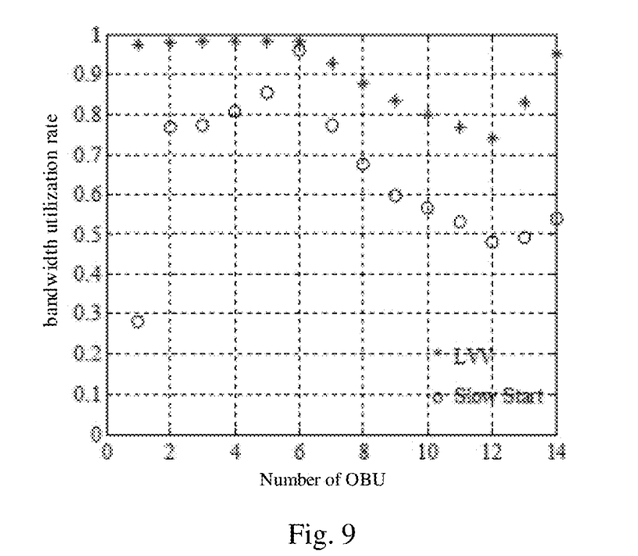
FIG. 9 is a comparison diagram illustrating changes of the respective bandwidth utilizations of the congestion window control algorithm according to embodiments of the present disclosure and the slow start control algorithm.

The effect comparison between the congestion window control algorithm (LUV) according to embodiments of the present disclosure and the slow start control algorithm (Slow Start) is described below according to FIG. 8 and FIG. 9. FIG. 8 illustrates a comparison diagram of changes of average congestion windows using the congestion window control algorithm according to embodiments of the present disclosure and the slow start control algorithm. FIG. 9 illustrates a comparison diagram of changes of bandwidth utilization rate of the congestion window control algorithm according to embodiments of the present disclosure and the slow start control algorithm.

As shown in FIG. 8, during a process of the number of the on-board units increasing from 1 to 4, the average congestion window according to the congestion window control algorithm of the embodiments of the present disclosure is higher than the average congestion window of the slow start control algorithm. In case that the physical bandwidth of the roadside unit is not exceeded, it is obvious that the larger the congestion window is, the higher the bandwidth utilization rate is. During a process of the number of the on-board units increasing from 7 to 12, the average congestion window assigned to OBU3 according to the congestion window control algorithm of the embodiments of the present disclosure is lower than the average congestion window assigned in the slow start control algorithm. This is because the reserved bandwidth does not produce actual traffic, so that assigning to much traffic for the reserved bandwidth may significantly reduce the bandwidth utilization rate of the roadside unit. During the process of the number of the on-board units increasing from 7 to 12, the average congestion window assigned to OBU2 according to the congestion window control algorithm of the embodiments of the present disclosure is higher than the average congestion window assigned in the slow start control algorithm, which can more efficiently utilize the bandwidth of the current roadside unit to send data traffic. During the process of the number of the on-board units increasing from 13 to 14, the on-board unit OBU1 is added to the network scenario. It can be seen from sub-figure (a) that the average congestion window of OBU1 is higher than the average congestion windows of OBU2 and OBU3, while the average congestion windows of the three types of on-board units in sub-figure (b) are almost the same. Therefore, it can be known that the congestion window control algorithm according to embodiments of the present disclosure may assign higher bandwidth to the on-board unit OBU1 with higher contribution and importance, while OBU2 is the second, and OBU3 is assigned the lowest bandwidth. It can be seen that the congestion window control algorithm according to embodiments of the present disclosure may assign the bandwidth according to the importance and contribution of the on-board units As shown in FIG. 9, the rule for increasing the number of the on-board units is consistent with that in FIG. 8. As shown in FIG. 9, during a process of the number of the on-board units increasing from 1 to 6, the number of OBU2 is increased at this time, bandwidth utilization rate according to the congestion window control algorithm of the embodiments of the present disclosure is always higher than the bandwidth utilization rate according to the slow start algorithm and changes a little. The bandwidth utilization rate of the slow start algorithm is gradually increased, and with the increase of the number of the on-board units, the average bandwidth utilization rate of the slow start algorithm comes close to the utilization rate of the congestion window control algorithm according to the present disclosure. In the process of the number of the on-board units increasing from 7 to 12, average bandwidth utilization rates of the two algorithms gradually decreases. The number of on-board units OBU3 is increased at this time, and OBU3 does not actually send traffic. Obviously, the reserved bandwidth will naturally reduce the bandwidth utilization rate. The more the bandwidth is reserved, the lower the bandwidth utilization rate is. During the process of the number of on-board units increasing from 13 to 14, the number of on-board units OBU1 is increased at this time, OBU1 will actually occupy the bandwidth, so that the bandwidth utilization rate will increase again. Therefore, the congestion window control algorithm according to embodiments of the present disclosure has a better average bandwidth utilization rate.

Figure 10:
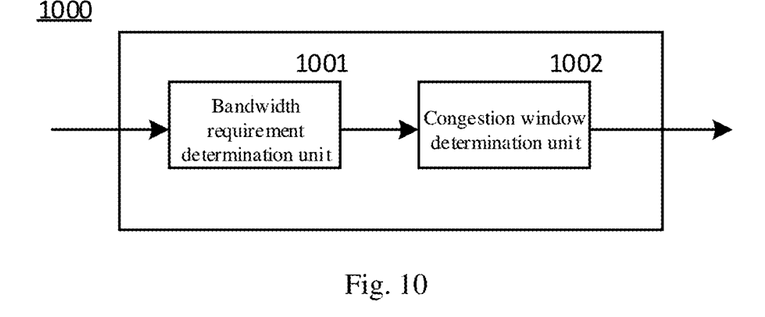
FIG. 10 is a block diagram illustrating a congestion window control apparatus according to embodiments of the present disclosure.

Hereinafter, a congestion window control apparatus according to embodiments of the present disclosure will be described with reference to FIG. 10. FIG. 10 illustrates a block diagram of the congestion window control apparatus according to embodiments of the present disclosure. Since the function of the congestion window control apparatus of this embodiment is the same as the details of the method described above with reference to FIG. 2, detailed description of the same content is omitted here for simplicity.

As shown in FIG. 10, the congestion window control apparatus 1000 includes a bandwidth requirement determination unit 1001 and a congestion window determination unit 1002. It should be noted that although the congestion window control apparatus is shown as including only two units in FIG. 10, this is only schematic. The congestion window control apparatus may also include one or more other units which are not related to the inventive concept of the present disclosure, so it is omitted here.

The bandwidth requirement determination unit 1001 is configured to determine the bandwidth requirement of each of the plurality of on-board unit sets.

The Internet of Vehicles includes the plurality of on-board unit sets, and the plurality of on-board unit sets corresponds to the plurality of on-board unit types.

As described above, the on-board units can be divided into different types according to importance and contribution of the on-board units. For example, the on-board units can be divided into types of cluster-headed on-board units OBU1, non-cluster-headed on-board units OBU2, and bandwidth-reserved on-board units OBU3. The cluster-head on-board unit OBU1 and the non-cluster-head on-board unit OBU2 are on-board units connected to the current roadside unit RSU1.

The plurality of on-board unit types corresponds to different on-board unit sets. For example, the cluster-head on-board unit OBU1 corresponds to the cluster-head on-board unit set, and the non-cluster-head on-board unit OBU2 corresponds to the non-cluster head on-board unit set, and the bandwidth-reserved on-board unit OBU3 corresponds to the bandwidth-reserved on-board unit set.

After determining the on-board unit sets, the congestion window determination unit 1002 may determine corresponding congestion window for each on-board unit set according to current communication states in the Internet of Vehicles.

First, for each of the plurality of on-board unit sets, the bandwidth requirement determination unit 1001 may determine the bandwidth requirement of the set according to the number of on-board units in the set and the reference bandwidth requirement of each on-board unit in the set.

According to the embodiments of the present disclosure, the reference bandwidth requirement of the on-board unit may be determined according to the type of the on-board unit. Different types of on-board units have different reference bandwidth requirements. The reference bandwidth requirements may be preset. For example, the control center may perform statistical analysis on the reference bandwidth requirements of different types of on-board units to preset the reference bandwidth requirements of the different types of on-board units. Alternatively, the reference bandwidth requirements of the different types of on-board units may be determined by the operator according to certain calculation rules, which may be related to the importance or contribution of the different types of on-board units. For example, because an on-board unit with high importance has the highest priority when applying for the bandwidth, it can be determined that a relatively high reference bandwidth requirement is set for this type of on-board unit, and relatively low reference bandwidth requirements are set for other on-board units with lower priority.

After the reference bandwidth requirement of each on-board unit in respective sets is determined, the control center may obtain a number of the on-board units belonging to different on-board unit sets from information sent by the on-board units. For each on-board unit set, the bandwidth requirement of the set may be determined according to the number of the on-board units in the set and the reference bandwidth requirements of each on-board unit in the set.

Next, the congestion window determination unit 1002 determines the congestion window for each of the plurality of on-board unit sets according to the bandwidth requirement of the respective on-board unit sets.

First, the congestion window determination unit 1002 determines, for each of the plurality of on-board unit sets, the maximum bandwidth capacity that the current roadside unit can assigned to the set according to the bandwidth requirements of the respective on-board unit sets.

After determining the maximum bandwidth capacity that the current roadside unit can assign to each of the plurality of on-board unit sets, the congestion window determination unit 1002 can determine the maximum congestion window for each of the plurality of on-vehicle unit sets according to the maximum bandwidth capacities that the current roadside unit can assign to the respective on-board unit sets.

After determining the maximum congestion window for each on-board unit set, for each of the plurality of on-board unit sets, the congestion window determination unit 1002 performs calculation iteratively according to the competition parameters between the set and other sets and the maximum congestion window of the set, to determine the congestion window for the set.

For example, the competition parameters between this set and other sets are predetermined based on statistical analysis. Under the premise of stable bandwidth, if the congestion window of one on-board unit set increases, in order to keep the roadside units from being congested, it is inevitable that the congestion windows of other on-board unit sets will decrease. The congestion window of each on-board unit set will affect congestion windows of other on-board unit sets. The values of the competition parameters between the on-board unit sets depend on the importance comparison and contribution comparison between the on-board unit sets. Based on this, the proportion of the competition parameters among a plurality of sets can be determined.

For each of the plurality of on-board unit sets, the congestion window determination unit 1002 may perform calculation iteratively to determine the congestion window for the set according to the competition parameters between the set and other sets, the competition parameter between the on-board units in the set, and the maximum congestion window of the set.

In the above steps, for each of the plurality of on-board unit sets, the congestion window determination unit 1002 may also perform calculation iteratively to determine the congestion window for the set according to the competition parameters between the set and other sets, the competition parameter between the on-board units in the set, and the maximum congestion window of the set.

Furthermore, during the process of performing calculation iteratively to determine the congestion window of the set, the competition parameter between the on-board units in the set may also be calculated iteratively.

In the above embodiment of the present disclosure, if no new on-board unit is added and no on-board unit that has been connected to the roadside unit is disconnected, the congestion window of each on-board unit will reach a stable state after a period of time. However, in actual environment for the Internet of Vehicles, the on-board units are randomly connected to or disconnected from the roadside unit. The above algorithm is adopted to calculate the congestion window for each newly connected on-board unit according to actual situation (such as the number of the on-board units connected to the roadside unit, the competition parameter between sets and the competition parameter in a set) until the congestion window reaches a stable state.

By using the above congestion window control apparatus, each on-board unit has one maximum congestion window, a total bandwidth of the on-board units connected to the roadside unit can thus be controlled to not be so large to cause serious congestion. In addition, this window can gradually increase based on the actual scenarios of the Internet of Vehicles, such as the number of on-board units connected and the types of the on-board units, thereby bandwidth may be adaptively assigned to different on-board units.

Figure 11:
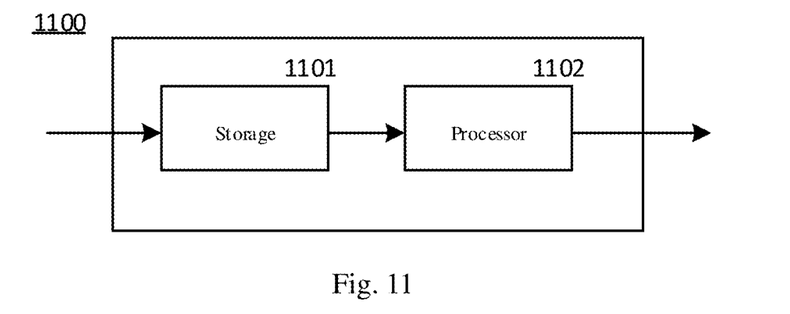
FIG. 11 is a block diagram illustrating a congestion window control device according to embodiments of the present disclosure.

Hereinafter, a congestion window control device according to embodiments of the present disclosure will be described with reference to FIG. 11. FIG. 11 illustrates a block diagram of the congestion window control device according to embodiments of the present disclosure. Since the function of the congestion window control device of this embodiment is the same as the details of the apparatus described above with reference to FIG. 10, a detailed description of the same content is omitted here for simplicity.

As shown in FIG. 11, the congestion window control device 1100 includes a memory 1101 and a processor 1102. It should be noted that although the congestion window control device is shown in FIG. 11 as including only two units, this is only schematic. The congestion window control device may also include one or more other units. These units are not related to the inventive concept, so it is omitted here.

The Internet of Vehicles may include a plurality of on-board unit sets corresponding to the plurality of different on-board unit types, as described above. For example, the cluster-head on-board unit OBU1 corresponds to the cluster-head on-board unit set, and the non-cluster-head on-board unit OBU2 corresponds to the non-cluster-head on-board unit set, and the bandwidth-reserved on-board unit OBU3 corresponds to the bandwidth-reserved on-board unit set. The congestion window control device 1100 may include a memory 1101 configured to store computer-readable instructions, and a processor 1102 configured to process the computer-readable instructions stored in the memory, where the processor 1102 implements the following instruction when executing the computer-readable instructions: determining the bandwidth requirement for each of the plurality of on-board unit sets; determining a congestion window for each of the on-board unit sets according to the bandwidth requirements of respective sets of the plurality of on-board unit sets, where the plurality of on-board unit sets corresponds to the plurality of on-board unit types respectively.

For example, the congestion window control device according to embodiments of the present disclosure may be separately configured in a vehicle, may also be integrated in inherent processor of the vehicle, and may be coupled with a power supply system to implement power supply to the control device. For example, on both sides of an expressway or a sparsely populated road (suburban, rural, mountainous, etc.), a plurality of roadside units as described above may be configured to communicate with the congestion window control device 1100 configured in the vehicle. Since the speed of the vehicle is fast, the communication between the vehicle and the roadside units may be implemented by switching frequently the communication between the roadside units. In addition, due to the sparse deployment of the roadside units, signal received by the roadside units is weak or no signal is received by the roadside units. In this case, the congestion window control device 1100 configured in the vehicle may determine corresponding congestion window for each on-board unit set according to the bandwidth requirements of each vehicle unit set according to the congestion window control method of the embodiments of the present disclosure, so that the on-board units (such as vehicles) in different communication states can adaptively obtain corresponding congestion windows, thereby avoiding the above-mentioned wireless transmission congestion phenomenon.

For each of the plurality of on-board unit sets, the bandwidth requirement of the set is determined according to the number of on-board units in the set and the reference bandwidth requirement of each on-board unit in the set, wherein the bandwidth requirement is determined based on the type of the on-board unit.

The maximum bandwidth capacity that the current roadside unit can assign to each of the plurality of on-board unit sets can be determined according to the bandwidth requirements of respective sets of the plurality of on-board unit sets; and the maximum congestion window of each of the plurality of on-board unit sets can be determined according to the maximum bandwidth capacity that the current roadside unit can assign to the set.

For each of the plurality of on-board unit sets, the congestion window of the set is determined by iterative calculation according to the competition parameters between the set and other sets and the maximum congestion window of the set.

Those skilled in the art can understand that aspects of the present application can be illustrated and described through several patentable categories or situations, including any new and useful process, machine, product or substance or combination thereof, or any new and useful improvements for them. Accordingly, aspects of the present application can be executed entirely by hardware, can be executed entirely by software (including firmware, resident software, microcode, etc.), and can also be executed by a combination of hardware and software. The above hardware or software can be called "data block", "module", "engine", "unit", "component" or "system". In addition, aspects of the present application may manifest as a computer product stored in one or more computer-readable medium, the product including computer-readable program code.

The present application uses specific words to describe embodiments of the present application. For example, "one embodiment", "an embodiment", and/or "some embodiments" means a certain feature, structure, or characteristic related to at least one embodiment of the present application. Therefore, it should be emphasized and noted that the "one embodiment" or "an embodiment" or "an alternative embodiment" mentioned two or more times in different places in this specification does not necessarily mean the same embodiment. In addition, certain features, structures, or characteristics in one or more embodiments of the present application may be appropriately combined.

Unless otherwise defined, all terms (including technical and scientific terms) used herein have the same meaning as commonly understood by those skilled in the art. It should also be understood that terms such as those defined in ordinary dictionaries should be interpreted as having meanings consistent with their meaning in the context of the relevant technology, and should not be interpreted in an idealized or extremely formal sense unless explicitly defined here.

The above is a description of the disclosure and should not be considered as limitation of the disclosure. Although several exemplary embodiments of the present disclosure have been described, those skilled in the art will readily understand that many modifications can be made to the exemplary embodiments without departing from the novel teachings and advantages of the present disclosure. Accordingly, all such modifications are intended to be included within the scope of this disclosure as defined by the claims. It should be understood that the above is a description of the present disclosure and should not be considered to be limited to the specific embodiments disclosed, and modifications to the disclosed embodiments and other embodiments are intended to be included within the scope of the claims. This disclosure is defined by the claims and their equivalents.

What is claimed is:

1. A congestion window control method for Internet of Vehicles comprising a plurality of on-board unit sets, comprising:
   determining a bandwidth requirement for each of the plurality of on-board unit sets; and
   determining a congestion window for each of the on-board unit sets according to the bandwidth requirements of respective sets of the plurality of on-board unit sets, wherein the congestion window corresponds to a bandwidth that can be assigned to the on-board unit, and
   each of the plurality of on-board unit sets corresponds to one of a plurality of on-board unit types respectively, the on-board unit types include cluster-head on-board unit, non-cluster-head on-board unit and bandwidth-reserved on-board unit, wherein
   the cluster-head on-board unit and the non-cluster-head on-board unit are on-board units which communicate with a current roadside unit, wherein the cluster-head on-board unit include on-board unit which implements its own bandwidth application and forwards traffic of the non-cluster-head on-board unit, and the non-cluster-head on-board unit only implements its own bandwidth application, and
   the bandwidth-reserved on-board unit is on-board unit which is connected to a neighbor roadside unit and is transmitting traffic.

2. The congestion window control method according to claim 1, wherein determining the bandwidth requirement for each of the plurality of on-board unit sets comprises:
   for each of the plurality of on-board unit sets, determining the bandwidth requirement for the set according to the number of the on-board units in the set and a reference bandwidth requirement of each on-board unit in the set, wherein the reference bandwidth requirement of the on-board unit is determined according to the type of the on-board unit.

3. The congestion window control method according to claim 1, wherein determining the congestion window for each of the on-board unit sets according to the bandwidth requirements of respective sets of the plurality of on-board unit sets comprises:
   determining a maximum bandwidth capacity assigned to each of the plurality of on-board unit sets by the current roadside unit according to the bandwidth requirements of respective sets of the plurality of on-board unit sets; and
   determining a maximum congestion window for each of the plurality of on-board unit sets according to the maximum bandwidth capacity assigned to each of the plurality of on-board unit sets by the current roadside unit.

4. The congestion window control method according to claim 3, wherein determining the congestion window for each of the on-board unit sets according to the bandwidth requirements of respective sets of the plurality of on-board unit sets further comprises:

for each of the plurality of on-board unit sets, determining the congestion window of the set by iterative calculation according to a competition parameter between the set and other sets and the maximum congestion window of the set.

5. The congestion window control method according to claim 3, wherein determining the congestion window for each of the on-board unit sets according to the bandwidth requirements of respective sets of the plurality of on-board unit sets further comprises:

for each of the plurality of on-board unit sets, determining the congestion window of the set by iterative calculation according to a competition parameter between the set and other sets, a competition parameter between the on-board units in the set and the maximum congestion window of the set.

6. The congestion window control method according to claim 5, further comprising:

calculating the competition parameter between the respective on-board units in each on-board unit set iteratively.

7. The congestion window control method according to claim 5, wherein the competition parameter between each on-board unit set and other on-board unit sets is predetermined according to statistical analysis.

8. The congestion window control method according to claim 3, wherein, for the Internet of Vehicles including three on-board unit sets $G_1$, $G_2$, and $G_3$, determining the bandwidth requirement of a first set $G_1$ of the plurality of on-board unit sets includes:

$$BR_1 = \frac{\theta_1 N_1}{\theta_1 N_1 + \theta_2 N_2 + \theta_3 N_3}$$

wherein $\theta 1$, $\theta 2$, and $\theta 3$ are reference bandwidth requirements corresponding to the three on-board unit sets, respectively, and $N_1$, $N_2$, and $N_3$ are numbers of the on-board units included in the on-board unit sets $G_1$, $G_2$, and $G_3$, respectively, determining the maximum congestion window of the first set $G_1$ of the plurality of on-board unit sets includes:

$R_1 = \min \{BCAP_{OBU(1)}, BMAX_{OBU(1)}\}$ wherein $BCAP_{OBU(1)}$ denotes a reference bandwidth capacity of the on-board unit set $G_1$, $BCAP_{OBU(1)} = BR_1 * BCAP_{RSU}$, and $BCAP_{RSU}$ denotes a reference bandwidth capacity of the current roadside unit.

9. A congestion window control apparatus for Internet of Vehicles comprising a plurality of on-board unit sets, comprising:

a bandwidth requirement determination unit configured to determine a bandwidth requirement for each of the plurality of on-board unit sets; and a congestion window determination unit configured to determine a congestion window for each of the on-board unit sets according to the bandwidth requirements of respective sets of the plurality of on-board unit sets, wherein the congestion window corresponds to a bandwidth that can be assigned to the on-board unit, and each of the plurality of on-board unit sets correspond to one of a plurality of on-board unit types respectively wherein the on-board unit types include cluster-head on-board unit, non-cluster-head on-board unit and bandwidth-reserved on-board unit, wherein the cluster-head on-board unit and non-cluster-head on-board unit are on-board units which communicate with a current roadside unit, wherein the cluster-head on-board unit includes on-board unit which implements its own bandwidth application and forwards traffic of the non-cluster-head on-board unit and the non-cluster-head on-board unit only implements its own bandwidth application, and the bandwidth-reserved on-board unit is on-board unit which is connected to a neighbor roadside unit and is transmitting traffic.

10. The congestion window control apparatus according to claim 9, wherein determining the bandwidth requirement for each of the plurality of on-board unit sets comprises:

for each of the plurality of on-board unit sets, the bandwidth requirement determination unit determines the bandwidth requirement for the set according to the number of the on-board units in the set and a reference bandwidth requirement of each on-board unit in the set, wherein the reference bandwidth requirement of the on-board unit is determined according to the type of the on-board unit.

11. The congestion window control apparatus according to claim 9, wherein determining the congestion window for each of the on-board unit sets according to the bandwidth requirements of respective sets of the plurality of on-board unit sets comprises:

the congestion window determination unit determines a maximum bandwidth capacity assigned to each of the plurality of on-board unit sets by the current roadside unit according to the bandwidth requirements of respective sets of the plurality of on-board unit sets; and the congestion window determination unit determines a maximum congestion window for each of the plurality of on-board unit sets according to the maximum bandwidth capacity assigned to each of the plurality of on-board unit sets by the current roadside unit.

12. The congestion window control apparatus according to claim 11, further comprising:

for each of the plurality of on-board unit sets, the congestion window determination unit determines the congestion window of the set by iterative calculation according to a competition parameter between the set and other sets and the maximum congestion window of the set.

13. The congestion window control apparatus according to claim 12, further comprising:

the congestion window determination unit calculates the competition parameter between the on-board units in each on-board unit set iteratively.

14. The congestion window control apparatus according to claim 13, wherein the competition parameter between each on-board unit set and other on-board unit sets is predetermined according to statistical analysis.

15. The congestion window control apparatus according to claim 11, further comprising:

for each of the plurality of on-board unit sets, the congestion window determination unit determines the congestion window of the set by iterative calculation according to a competition parameter between the set and other sets, a competition parameter between the on-board units in the set and the maximum congestion window of the set.

16. A congestion window control device for Internet of Vehicles comprising a plurality of on-board unit sets, comprising:
    a memory configured to store computer-readable instructions, and
    a processor configured to process the computer-readable instructions stored in the memory, wherein, when processing the computer-readable instructions, the processer executes functions of:
    determining a bandwidth requirement for each of the plurality of on-board unit sets; and
    determining a congestion window for each of the on-board unit sets according to the bandwidth requirements of respective sets of the plurality of on-board unit sets, wherein the congestion window corresponds to a bandwidth that can be assigned to the on-board unit, and
    each of the plurality of on-board unit sets correspond to one of a plurality of on-board unit types respectively, the on-board unit types include cluster-head on-board unit non-cluster-head on-board unit and bandwidth-reserved on-board unit, wherein
    the cluster-head on-board unit and the non-cluster-head on-board unit are on-board units which communicate with a current roadside unit wherein the cluster-head on-board unit include on-board unit which implements its own bandwidth application and forwards traffic of the non-cluster-head on-board unit, and the non-cluster-head on-board unit only implements its own bandwidth application, and
    the bandwidth-reserved on-board unit is on-board unit which is connected to a neighbor roadside unit and is transmitting traffic.

17. The congestion window control device according to claim 16, wherein determining the bandwidth requirement for each of the plurality of on-board unit sets comprises:
    for each of the plurality of on-board unit sets, determining the bandwidth requirement for the set according to the number of the on-board units in the set and a reference bandwidth requirement of each on-board unit in the set, wherein the reference bandwidth requirement of the on-board unit is determined according to the type of the on-board unit.

18. The congestion window control device according to claim 16, wherein determining the congestion window for each of the on-board unit sets according to the bandwidth requirements of respective sets of the plurality of on-board unit sets comprises:
    determining a maximum bandwidth capacity assigned to each of the plurality of on-board unit sets by the current roadside unit according to the bandwidth requirements of respective sets of the plurality of on-board unit sets; and
    determining a maximum congestion window for each of the plurality of on-board unit sets according to the maximum bandwidth capacity assigned to each of the plurality of on-board unit sets by the current roadside unit.

19. The congestion window control device according to any one of claim 18, further comprising:
    for each of the plurality of on-board unit sets, determining the congestion window of the set by iterative calculation according to a competition parameter between the set and other sets and the maximum congestion window of the set.

* * * * *